(12) United States Patent
Yamada et al.

(10) Patent No.: US 6,462,804 B1
(45) Date of Patent: Oct. 8, 2002

(54) DISPLAY APPARATUS AND ITS COOLING METHOD

(75) Inventors: Susumu Yamada, Chiba; Hiroshi Takatsuka; Hiroyuki Ono, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,184

(22) Filed: Apr. 1, 1999

(30) Foreign Application Priority Data

Apr. 6, 1998 (JP) .......................................... 10-0934460

(51) Int. Cl.⁷ ........................ G02F 1/1333; G02F 1/153
(52) U.S. Cl. .......................................... 349/161; 349/58
(58) Field of Search ............................. 349/5, 161, 58; 361/687–690, 694–697, 174, 165

(56) References Cited

U.S. PATENT DOCUMENTS

| 3,860,333 A | | 1/1975 | Graef |
| 4,334,742 A | * | 6/1982 | Link et al. ..................... 353/78 |
| 4,660,132 A | * | 4/1987 | Basler et al. ................ 362/294 |
| 4,787,737 A | * | 11/1988 | Ogawa et al. ................. 353/57 |
| 4,925,295 A | * | 5/1990 | Ogawa et al. ................. 353/57 |
| 5,404,283 A | * | 4/1995 | Yantz ........................... 362/267 |
| 5,666,171 A | | 9/1997 | Nakamura et al. |
| 5,676,442 A | | 10/1997 | Fujimori |
| 5,743,611 A | * | 4/1998 | Yamaguchi ................... 353/31 |
| 6,007,205 A | * | 12/1999 | Fujimori ....................... 353/57 |

FOREIGN PATENT DOCUMENTS

| DE | 3320108 | 12/1984 |
| JP | 4147291 | 5/1992 |

* cited by examiner

*Primary Examiner*—Toan Ton
*Assistant Examiner*—Hoan C Nguyen
(74) *Attorney, Agent, or Firm*—Jay H. Maioli

(57) ABSTRACT

A display apparatus and its cooling method in which the optical assemblies can be prevented from being smudged by dust entered into the apparatus so that an excellent image can be obtained and the apparatus can be cooled sufficiently with the apparatus including a housing having a screen on its front surface and a closed structure, an optical block having a closed structure and coupled with the housing in a closed fashion allowing air to circulate between the housing and the optical block. Further, the display apparatus includes a light source, a first cooling device for cooling the light source and a second cooling device for cooling the optical block. At least the optical block is arranged to have a closed structure and is cooled by air circulation.

18 Claims, 7 Drawing Sheets

DISPLAY APPARATUS AND ITS COOLING METHOD

BACKGROUND OF THE INVENTION

1. Field of the Invention

The present invention relates to a display apparatus for use with a liquid-crystal projector or the like, for example, and its cooling method.

2. Description of the Related Art

Heretofore, in a liquid-crystal projector apparatus in which a light from a light source is irradiated on a liquid-crystal light bulb and a light traveled through the liquid-crystal light bulb is projected by a projection lens onto a screen, thereby displaying an image, cooling methods have been devised in order to prevent the liquid-crystal light bulb and various kinds of optical assemblies from becoming a high temperature by the heat from the light source.

There is known a method of cooling the liquid-crystal light bulb and various optical assemblies by a fan to take the open air into the set of the liquid-crystal projector apparatus, for example.

However, according to this cooling method, since dusts also are taken in at the same time the open air is taken in, it is unavoidable that the liquid-crystal light bulb and various kinds of optical assemblies are smudged by dusts.

As a result, dusts shuts off or irregularly reflects light traveled through the liquid-crystal light bulb with the result that an image is affected by troubles such as smudge and blur.

For the purpose of preventing the liquid-crystal light bulb and various kinds of optical assemblies from being smudged by the above-mentioned dusts, it is customary that a dust-removing filter is attached to an air inlet of the open air.

However, even though the dust-removing filter is attached to the air inlet, dusts that are smaller than the mesh of the filter cannot be removed so that fine dusts are accumulated in the inside of the liquid-crystal projector apparatus, thereby causing the aforementioned problem.

Further, according to this method, although a dust removing effect is not perfect, it is cumbersome for a user to frequently clean the filter.

Also, in the above-mentioned cooling method using the fan, since a fan noise is radiated to the outside of the housing of the liquid* crystal projector apparatus, such fan noise becomes an undesired noise other than sound to cause unpleasantness in a user/viewer while the liquid-crystal projector apparatus is in use.

As a cooling method other than the above-mentioned methods, there is considered such a cooling method in which an optical block including a liquid-crystal light bulb of the liquid-crystal projector apparatus is made of the closed type to circulate the air within the optical block.

However, since a volume of the air within the optical block is small, when this method is in use, a heat radiation property of the closed optical block should be increased so that the structure of the liquid-crystal projector apparatus tends to become complex.

SUMMARY OF THE INVENTION

It is an object of the present invention to provide a display apparatus and its cooling method in which optical assemblies can be prevented from being smudged by dusts entered into the apparatus so that an excellent image can be obtained and the apparatus can be cooled sufficiently.

A display apparatus according to the present invention comprises a housing having a screen provided on its front surface and a closed structure, an optical block having a closed structure coupling device for coupling the housing and the optical block in a closed fashion to thereby circulate the air.

According to the above-mentioned present invention, since the housing and the optical block, each having the closed structure, of the display apparatus are coupled by the coupling device which circulates the air, the air circulation route can be closed to prevent dust from entering into the optical block from the outside. Thus, a picture quality can be prevented from being lowered due to dusts which smudge the optical assemblies, thereby making it possible to obtain a satisfactory image.

Also, since the air is circulated into the housing and the optical block via the coupling means to cool the air, the optical block can be cooled efficiently under the condition that dusts are not entered into the optical block from the outside.

Also, since the optical block has the closed structure, the fan noise can be prevented from being emanated to the outside when the air flow generating means or the fan is disposed in the inside to circulate the air, for example.

When heat of the air heated within the optical block is radiated through the housing, by effectively utilizing the wide space of the housing, it is possible to more efficiently radiate the heated air.

According to the above-mentioned arrangement of the present invention, since the air is circulated between the housing and the optical block through the coupling means to cool the air during such circulation, the optical block can be cooled.

A display apparatus according to the present invention includes a housing having a screen provided on its front surface, an optical block, a light source, a first cooling device for cooling the light source and a second cooling device for cooling the optical block.

According to the above-mentioned arrangement of the present invention, the first cooling device and the second cooling device can be formed as different cooling device in correspondence with the light source and the optical block.

Also, since the present invention includes the first cooling device for cooling the light source and the second cooling device for cooling the optical block, the first cooling device and the second cooling device can be served as the respective different cooling means in correspondence with the light source and the optical block. Hence, there can be provided proper cooling device in correspondence with the light source and the optical block whose heat generating amounts are different considerably.

Accordingly, it is possible to improve the respective cooling efficiencies of the light source and the optical block. Further, since a freedom with which the light source and the optical block are designed increases, it is possible to provide the display apparatus having a more preferable arrangement.

A cooling method of a display apparatus according to the present invention is a cooling method of a display apparatus having a screen provided on its front surface and which includes a housing, an optical block and a light source, in which at least the optical block is arranged to have the closed structure to thereby cool the optical block by circulation of the air.

According to the present invention, the optical block is formed as the closed structure, whereby the optical block can be cooled by circulation of the air under the condition that dusts are not entered into the apparatus.

Further, a cooling method of a display apparatus according to the invention is a cooling method of a display apparatus includes a housing having a screen provided on its front surface, an optical block and a light source, wherein the light source is cooled by a first cooling device and the optical block is cooled by a second cooling device.

According to the present invention, the first cooling device and the second cooling device can be formed as different cooling device in correspondence with the light source and the optical block, respectively.

DESCRIPTION OF THE PREFERRED EMBODIMENTS

A display apparatus and a cooling method therefor according to the present invention will be described with reference to the accompanying drawings.

Figure 1:
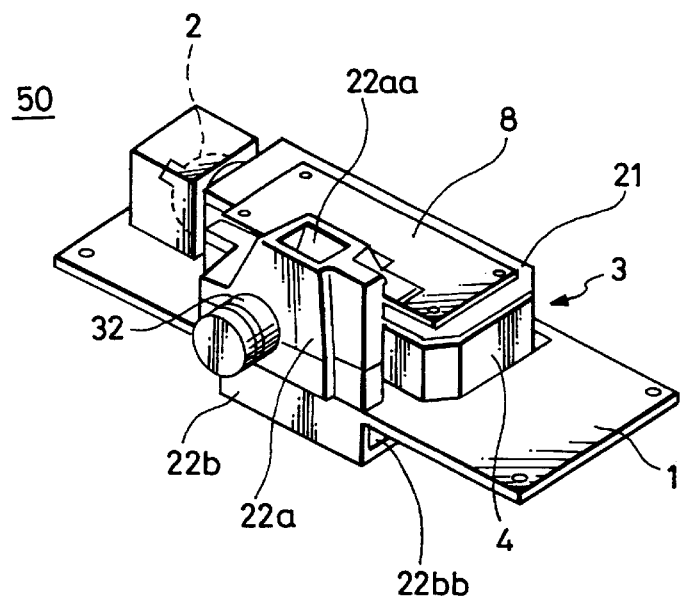
FIG. 1 is a schematic diagram (perspective view) showing an optical system arrangement unit disposed in a liquid-crystal projector apparatus used in a display apparatus according to an embodiment of the present invention.
Figure 2:
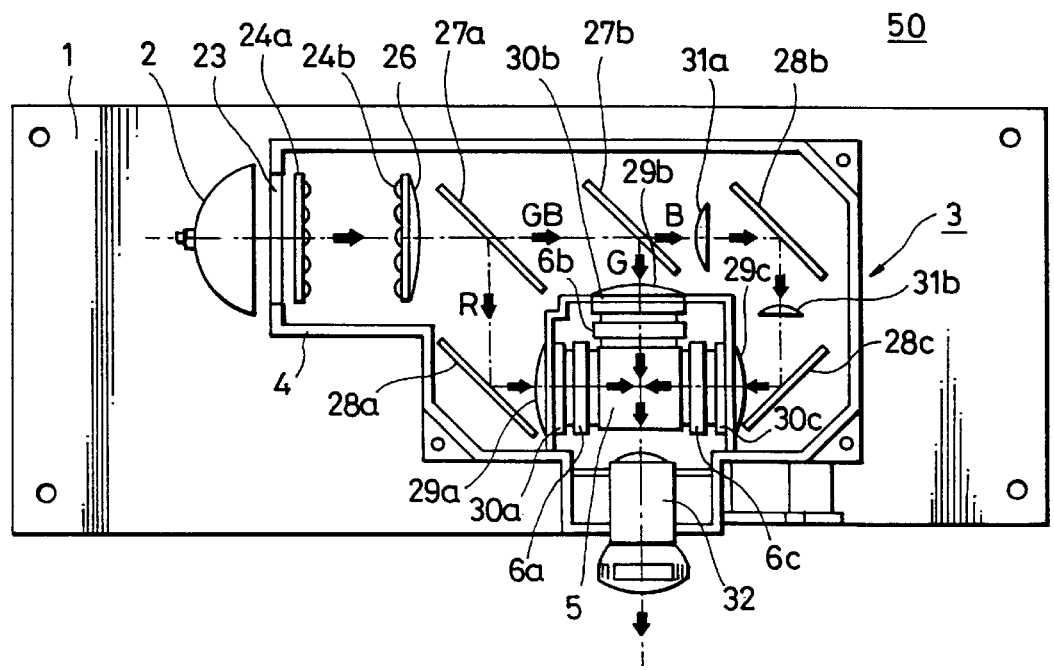
FIG. 2 is a diagram showing the inside of the optical block of the optical system arrangement unit in FIG. 1.
Figure 3:
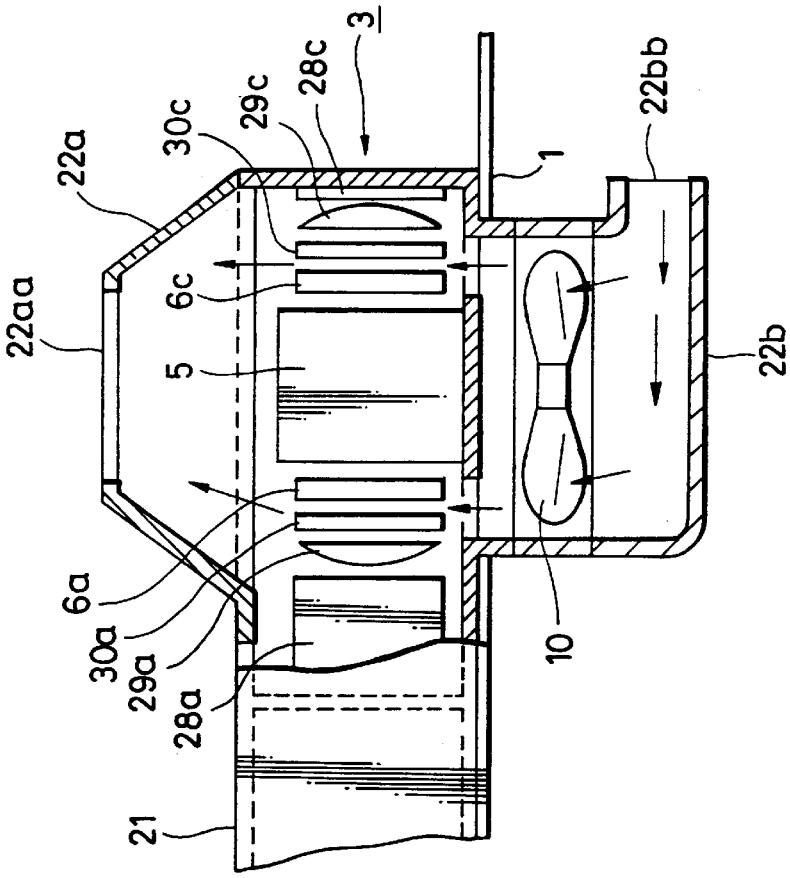
FIG. 3 is a cross-sectional side view of a main portion of the optical system arrangement unit in FIG. 1.

FIG. 1 shows, as an embodiment of a display apparatus according to the present invention, a schematic arrangement of an optical system arrangement unit disposed within the projector apparatus when the present invention is applied to a liquid-crystal projector apparatus. FIG. 2 is a cross-sectional view along the horizontal plane showing the inside of the optical system arrangement unit of FIG. 1. FIG. 3 is a cross-sectional side view showing a main portion in FIG. 1.

In this optical system arrangement unit 50, a light source 2 and an optical block 3 are disposed on a base plate 1 as shown in FIG. 1.

Then, the optical block 3 includes an optical block case 4, a lid 21 for closing the upper portion of the optical block case 4, an upper duct 22a located ahead of the optical block 3 and a lower duct 22b provided under the base plate 1 with respect to the upper duct 22a, and houses therein optical assemblies. The upper duct 22a has an 22aa defined therein, and the lower duct 22b, which is disposed under the base plate 1, also has an opening 22bb defined therein in response to the upper duct 22a.

That is, the optical block 3 has the structure in which other portions than these openings 22aa, 22bb are closed by the optical block case 4 and the lid 21.

A driving circuit 8 for driving liquid-crystal light bulbs 6 (6a, 6b, 6c) is formed on the upper portion of the lid 21.

Also, the upper duct 22a is detachable so that, when the upper duct 22a is removed, registrations of the liquid-crystal light bulbs can be adjusted, i.e. overlapping of images can be adjusted.

The optical block 3 further includes the inside arrangement shown in FIG. 2, for example. That is, lens arrays 24a, 24b, and a condenser lens 26 are disposed from the side of the light source 2, and dichroic mirrors 27a, 27b and reflection mirrors 28a, 28b, 28c are disposed for separating the light from the light source 2 to provide light of three colors of red, green and blue (RGB). On the routes through which light of separated three colors travels, there are further disposed condenser lenses 29a, 29b, 29c, polarizing plates 30a, 30b, 30c and the liquid-crystal light bulbs 6a, 6b, 6c, thereby causing lights of three colors to become incident on respective faces of a synthetic prism 5 at the succeeding stage. Then, at the succeeding stage of the synthetic prism 5, there is provided a projection lens 32 for projecting a synthesized light in an enlarged scale.

An operation of this optical block 3 will be described.

The irradiation light generated from the light source 2 such as a metal halide lamp or the like is passed through a cut filter 23 for cutting ultraviolet rays and infrared rays and is introduced into the optical block 3. This cut filter 23 has also a function to close the optical block 3.

Light incident on the optical block 3 travels through the lens arrays 24a, 24b and the condenser lens 26. Red light R is separated and reflected by the dichroic mirror 27a. The red light T thus separated is reflected on the reflection mirror 28a, travels through the condenser lens 29a and the polarizing plate 30a, and travels through the red liquid-crystal light bulb 6a.

Similarly, with respect to illumination light traveled through the dichroic mirror 27a, i.e. green light G and blue light B, the green light G is separated and reflected by the dichroic mirror 27b, and the separated green light G travels through the condenser lens 29b and the polarizing plate 30b and travels through the green liquid-crystal light bulb 6b.

On the other hand, the blue light B traveled through the dichroic mirror 27b is reflected by the reflection mirrors 28b and 28c, travels through the condenser lens 29c and the polarizing plate 30c and travels through the blue liquid-crystal light bulb 6c. In the sheets of drawings, reference numerals 31a and 31b denote lenses.

Thereafter, lights traveled through the liquid-crystal light bulbs 6a, 6b, 6c of the three colors are synthesized by the synthetic prism 5 and projected onto a predetermined screen by a projection lens 32 in an enlarged scale.

In this manner, an image is displayed on the screen by the optical block 3.

A cooling mechanism of this optical block 3 will be described next.

As previously shown in FIG. 1, the upper duct 22a includes the opening 22aa, and the lower duct 22b, which is provided under the base plate 1, also includes the opening 22bb in correspondence with the upper duct 22a. Through these openings 22aa, 22bb, the air for cooling is introduced into/exhausted from the optical block 3.

Then, in order to introduce/exhaust the air, as shown in FIG. 3, for example, a fan 10 is provided within the lower duct 22b as an air flow generating means, whereby the air is introduced from the opening 22bb of the lower duct 22b and entered into the optical block 3. The air is heated when the air cools the inside of the optical block 3. The air thus heated is exhausted from the opening 22aa of the upper duct 22a.

In the case of FIG. 3, clearances through which the air can flow are formed among the reflection mirrors 28a, 28c, the condenser lens 29a, 29c, the polarizing plates 30a, 30c, the liquid-crystal light bulbs 6a, 6c and the synthetic prism 5, thereby making it possible to efficiently cool the inside of the optical block.

Also, although the fan 10 is formed in the lower duct 22b as the air flow generating means to forcibly circulate the air in FIG. 3, the air flow generating means such as the fan 10 or the like may be provided within the upper duct 22a or the air flow generating means may be provided within a tube coupled to the upper duct 22a and the lower duct 22b so as to force the air to be circulated.

At any rate, the air flow generating means is provided on at least one of the suction side and the exhaust side, whereby the air is forced to be circulated.

Instead of the forced circulation executed by the air flow generating means, the air may be circulated by a natural convection.

Figure 4:
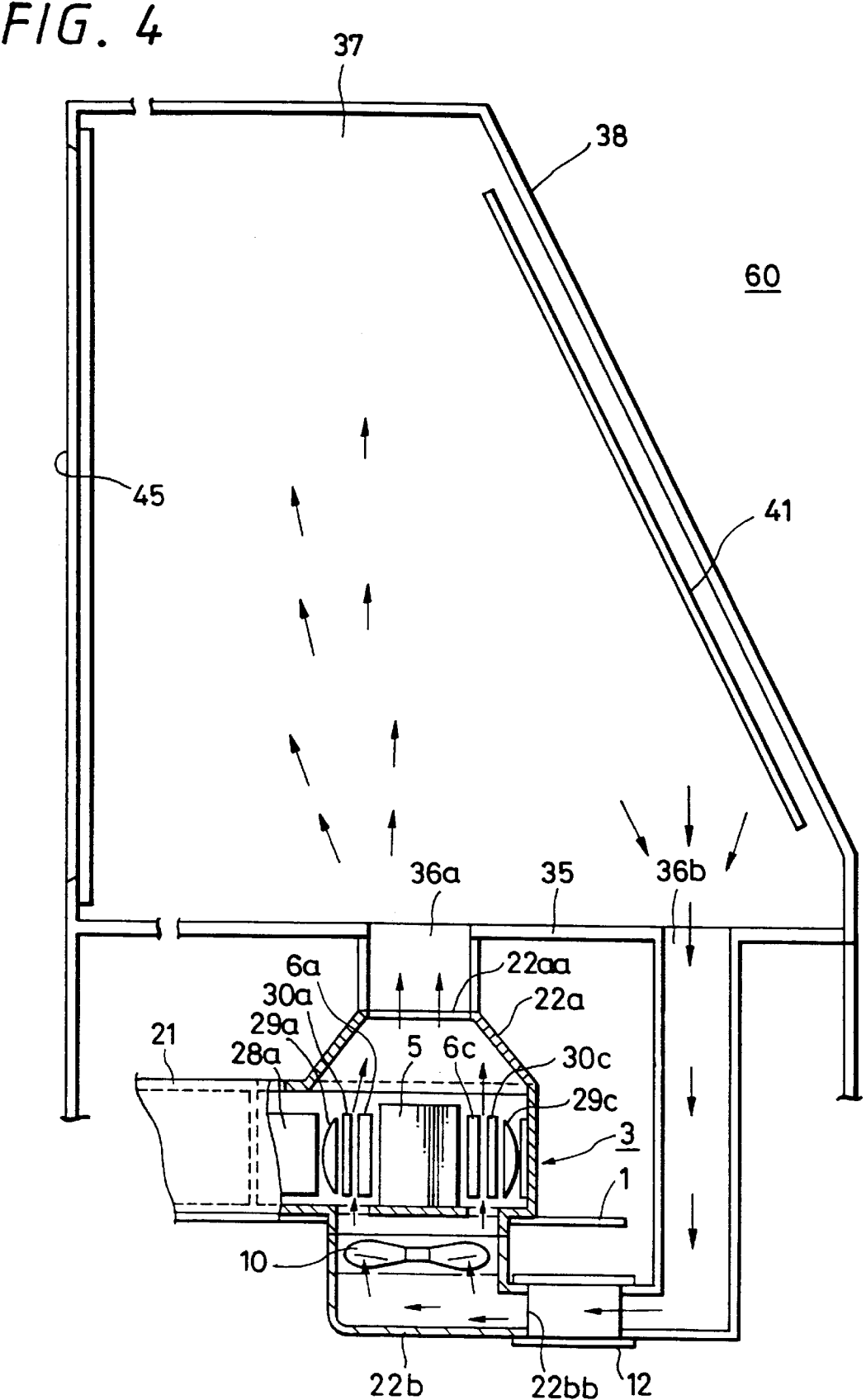
FIG. 4 is a cross-sectional view showing the state in which the liquid-crystal projector apparatus is comprised of the optical system arrangement unit in FIG. 1.

Next, as an embodiment of the display apparatus according to the present invention, FIG. 4 shows the embodiment in which a liquid-crystal projector apparatus 60 is arranged by assembling the optical system arrangement unit 50 shown in FIGS. 1 to 3 into a housing having a screen provided on its front surface.

This liquid-crystal projector apparatus 60 comprises the optical system arrangement unit 50 in which the light source 2 and the optical block 3 are disposed on the previously-shown base plate 1 and a housing 38 having a screen 45 provided on its front surface in which an overall structure of the liquid-crystal projector apparatus 60 is formed.

The housing 38 is separated by a partition portion 35 into an upper portion and a lower portion. The optical system arrangement unit 50 (see FIGS. 1 to 3) including the light source 2 and the optical block 3 is disposed in the lower portion, and the upper portion includes a large space 37 closed by the partition portion 35.

Projection light (not shown) from the projection lens 32 of the optical block 3 travels through the inside of this large space 37, reflected by a mirror 41 disposed at the rear surface side within the housing 38 and is traveled toward the screen 45 at the front surface of the liquid-crystal projector apparatus 60.

Incidentally, the partition portion 35 which separates the upper portion and the lower portion of the housing 38 has an opening not shown. The tip end of the projection lens 32 is protruded into the space 37 of the upper portion of the housing 38 from the opening, whereby the light can be projected onto the reflection mirror 41.

A material such as rubber packing or the like is filled into the space between this opening and the projection lens 32, thereby resulting in the space 37 at the upper portion of the housing 38 being closed.

Then, as shown in FIG. 4, the partition portion 35, which separates the upper portion and the lower portion of the housing 38 has two opening portions 36a, 36b bored therethrough to circulate the air.

Also, the upper duct 22a and the lower duct 22b formed on the optical block 3 are coupled to the opening portions 36a, 36b directly or via a coupling means such as other joint assemblies or the like.

If the openings 22aa, 22bb respectively defined in the two ducts 22a, 22b are coupled to the space 37 of the upper portion of the housing of the set, then the they have a joint function to circulate the air within the space 37 of the upper portion of the housing of the set into the inside space of the optical block 3.

In the case of FIG. 4, the upper duct 22a and the opening portion 36a are directly coupled, and the lower duct 22b and the opening portion 36b are coupled through a joint pipe 12 serving as the joint assembly.

Thus, the space 37 of the upper portion of the housing 38 of the liquid-crystal projector apparatus 60 and the optical block 3 may be coupled in the closed state.

In this liquid-crystal projector apparatus 60, upon its operation, the aforementioned illumination light heats the liquid-crystal bulbs 6a, 6b, 6c of three colors and the polarizing plates 30a, 30b, 30c or the like provided within the optical block 3 and the air heated by the radiation of heat from these optical assemblies is forced to be circulated by the fan 10 provided within the lower duct 22b of the optical block 3, thereby entered into the space 37 of the upper portion of the housing 38.

Incidentally, the air may be either forced to be circulated by the air flow generating means such as the fan or the like as mentioned before or by a natural convection.

Also, in this liquid-crystal projector apparatus 60, although the screen 45 is disposed within the closed housing 38, the screen may be disposed outside the closed structure and may be attached to the front surface of the display apparatus.

As an embodiment of a display apparatus and its cooling method, FIGS. 5 to 8 show a cooling device (means for radiating heat of the heated air) for cooling the heated air entered into the space 37 of the upper portion of the housing 38 of the liquid-crystal projector apparatus 60 and a mode of a cooling method.

Figure 5:
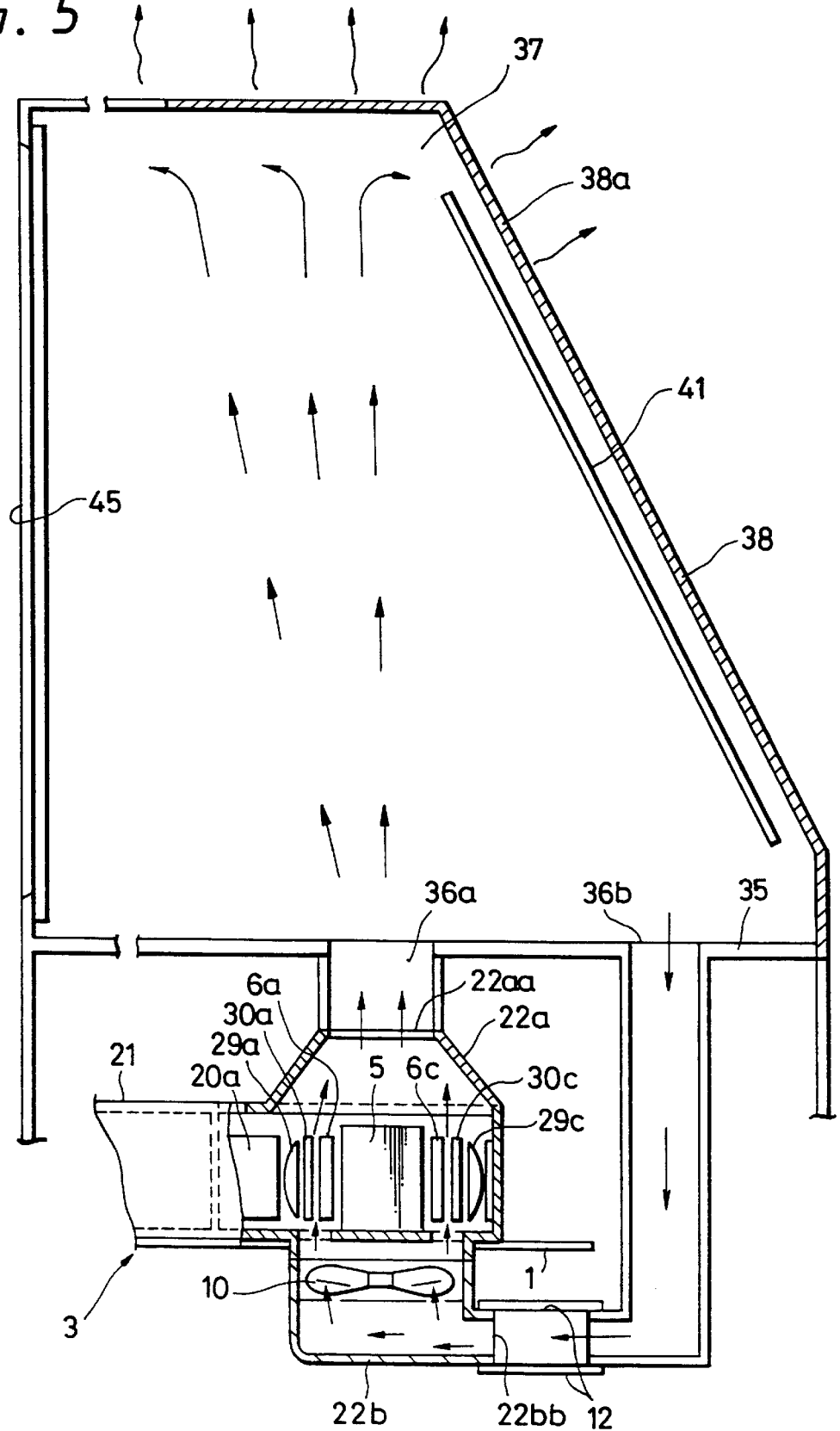
FIG. 5 is a cross-sectional view showing an embodiment of a cooling device of the optical block of the liquid-crystal projector apparatus.

Initially, FIG. 5 shows a mode in which the heated air entered into the space 37 of the upper portion of the housing 38 contacts with the whole of the wide area of the space 37 within the housing 38 to efficiently conduct heat thereto and such heat is radiated through the housing 38 to the outside of the housing 38.

To be concrete, heat of the heated air is radiated to the outside from the upper surface or the rear surface of the housing 38.

The whole of the housing 38 or a part thereof, e.g. part 38a, shown hatched in FIG. 5, should preferably be made of a material having excellent heat conduction, such as a metal or the like. Thus, it is possible to further improve a heat radiation efficiency.

Figure 6:
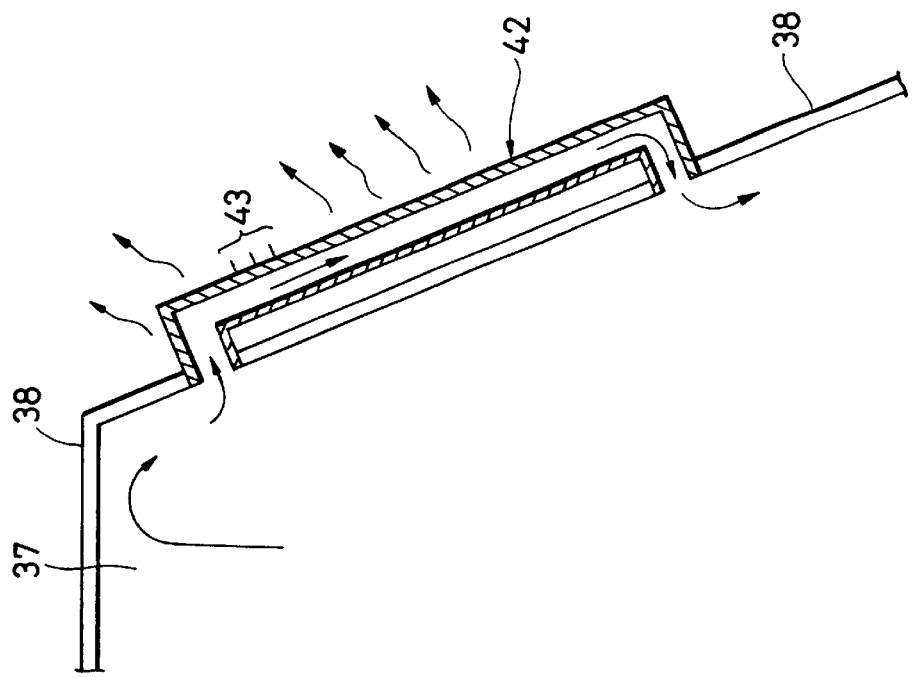
FIG. 6 is a cross-sectional view showing other embodiment of the cooling device of the optical block of the liquid-crystal projector apparatus.

Then, FIG. 6 shows the case in which a heat-radiator 42 is provided as the heat-radiating structure exposed from the housing 38 to the outside in order to more efficiently radiate heat of the heated air to the outside of the housing 38.

The heat radiator 42 is made of a pipe-like metal and its both ends are connected to the housing 38 so as to communicate therewith.

Then, since this heat-radiator 42 is exposed to the outside from the housing 38, the surface area of the portion which is exposed to the open air is large, thereby making it possible to efficiently radiate heat.

Also, as FIG. 6 shows a part thereof, it is possible to further improve a heat-radiation efficiency of the heat-radiator 42 by attaching fins 43 to the surface of the heat-radiator as heat-radiation protrusions.

Figure 7:
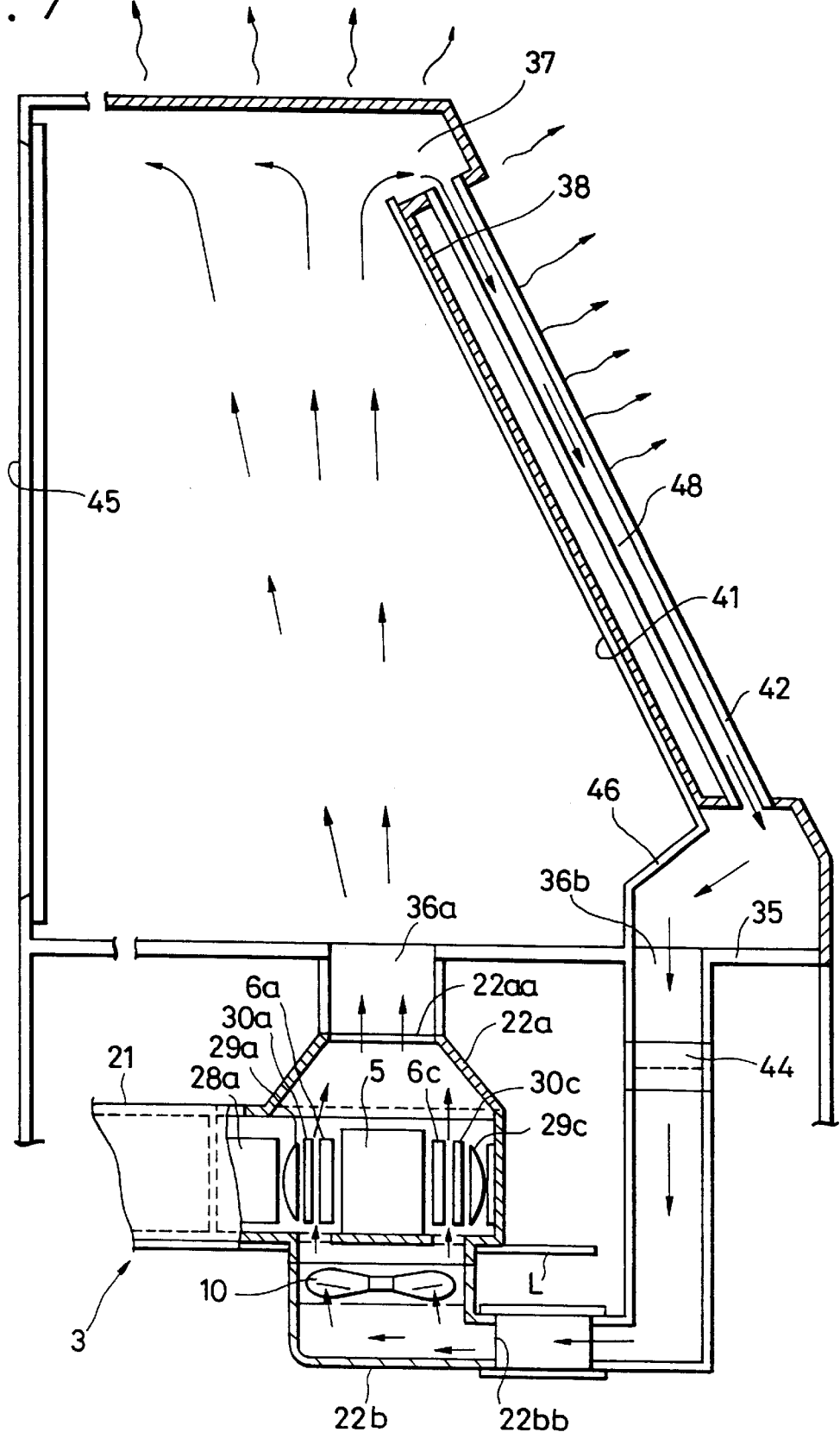
FIG. 7 is a cross-sectional view showing a further embodiment of the cooling device of the optical block of the liquid-crystal projector apparatus.

FIG. 7 shows the mode for restricting the flow of the air entered into the space 37 of the upper portion of the housing 38.

In this case, the housing 38 is contacted with the rear side of the reflection mirror 41, and further the heat-radiator 42 having a function similar to that of FIG. 6 is disposed to be exposed to the outside of the housing 38.

The portion 38a including the portion which contacts with the reflection mirror 41 as shown by hatched portions of the rear surface and the upper surface of the housing 38 is made of a material having excellent heat conduction such as a metal or the like similarly as described above.

Further, in this embodiment, for the purpose of preventing the air cooled by the heat-radiator 42 and the air heated by the optical block 3 from being mixed together, there is provided a partition plate 46 covering the outlet of the heat-radiator 42 to the partition plate 35. Thus, there is formed an air flow restricting path 48 ranging from the heat-radiator 42 to the opening portion 36b of the partition portion 35 to restrict the flow of the air circulated in the housing 38.

Also in this embodiment, the fan 10 is disposed between the lower duct 22b and the optical assembly such as the synthetic prism 5 or the like within the optical block 3 as the air flow generator.

Then, by the air flow generated by the fan 10 disposed within the optical block 3, the air heated within the optical block 3 is radiated on the upper surface of the housing 38 and supplied from the upper portion of the space 37 within the housing 38 to the heat-radiator 42.

The air supplied to the heat-radiator 42 is cooled by this heat-radiator 42 and again entered into the optical block 3 from the opening portion 36b defined in the partition plate 35 through the opening 22bb and the lower duct 22b.

In this manner, the flow of air is restricted in such a manner that the heated air may be constantly passed through the heat-radiator 42 and again entered into the optical block 3.

If the flow of air had not been restricted, the air, which is not cooled, would be mixed into the air entered into the optical block 3, thereby resulting in the temperature of the air being raised.

On the other hand, if the flow of air is restricted as in this embodiment, then the air entered into the optical block 3 is supplied after it was completely processed by the cooling process, thereby making it possible to prevent the temperature from being raised.

Incidentally, as another method of restricting the flow of air, with application of the method using the heat-radiator 42 shown in FIG. 6, the heat-radiator 42 may be attached through the housing 38 to the rear surface of the mirror 41 for reflecting rays of light of an image.

Figure 8:
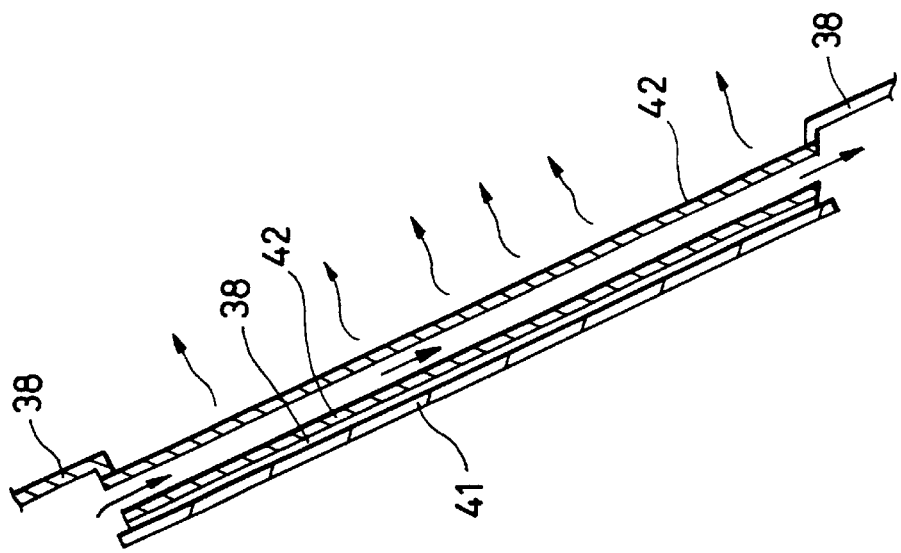
FIG. 8 is a cross-sectional view showing yet a further embodiment of the cooling device of the optical block of the liquid-crystal projector apparatus.

Incidentally, if a plurality of heat-radiators 42 shown in FIGS. 6 to 8 are formed on the rear surface of the housing 38 in parallel one another, then it is possible to improve the heat-radiation efficiency.

In the embodiment shown in FIG. 7, in the above-mentioned air circulation route of the cooling system, a dust collector 44 is provided somewhere in the route. Thus, it is possible to eliminate dusts from the closed structure while the liquid-crystal projector apparatus 60 is in use.

At that time, dusts are not entered into the housing 38 and the optical block 3 of the closed structure from the outside. Further, since dusts mixed into the space between the upper portion 37 of the housing of the set and the optical block 3 when the liquid-crystal projector apparatus 60 is manufactured can be eliminated by this dust collector 44, it is possible to completely exclude the influence exerted upon an image by dusts.

Also, this dust collector 44 should preferably be made detachable in order to clean dusts. After the dust collector is cleaned, it is attached to the predetermined position again.

According to each of the above-mentioned embodiments, since the space of the upper portion of the housing 38 and the optical block 3 of the liquid-crystal projector apparatus 60 are coupled by the closed structure, it is possible to prevent dusts from entering the optical block 3 from the outside.

Also, since the optical block 3 is of the closed structure, it is possible to prevent the fan noise from being emanated to the outside when the fan 10 is operated.

Incidentally, if the material of the housing 38 is selected to be a material having excellent heat conduction such as a metal from which heat can be radiated easily, then heat adsorption/heat generating effect of the housing 38 may be improved.

Further, by connecting the heat-radiator 42 made of a material having excellent heat conduction such as a metal pipe or the like exposed to the outside from the housing 38, it is possible to add similar effects.

Further, by additionally providing the protruded fins or the like on the surfaces of the housing 38 and the heat radiator 42 as the heat-radiation members, it is possible to further improve the heat adsorption and heat generation effects.

Also, as shown in FIG. 7, by providing the partition plate 46 for restricting the flow of the heated air entered into the space 37 of the upper portion of the housing 38 and the flow of the cooled air, the heated air can be prevented from being mixed into the cooled air, thereby making it possible to improve the cooling effect.

Further, as shown in FIG. 7, by providing the dust collector 44 in the air circulation route having the closed structure, dusts entered when the set of the liquid-crystal projector apparatus is manufactured also can be removed. Accordingly, it is possible to completely exclude the effects exerted by dusts.

Although each of the above-mentioned arrangements can achieve the effects solely, a plurality of arrangements may be combined.

Since any of the above-mentioned structures has the closed structure, there is then the merit in which dusts can be prevented from being entered, and also the optical block 3 can be cooled efficiently.

Also, in the present invention, the first cooling device for cooling the light source 2 and the second cooling device for cooling the optical block 3 may be arranged separately.

Thus, optimum cooling devices can be used in response to the light source 2 and the optical block 3 so that the two cooling devices can be prevented from being affected by each other and can cool the light source and the optical block independently.

The aforementioned respective embodiments shown in FIGS. 3 to 8 can be applied to the second cooling device which cools the optical block 3.

On the other hand, as the first cooling device for cooling the light source 2, the following embodiment may be considered.

Figure 9:
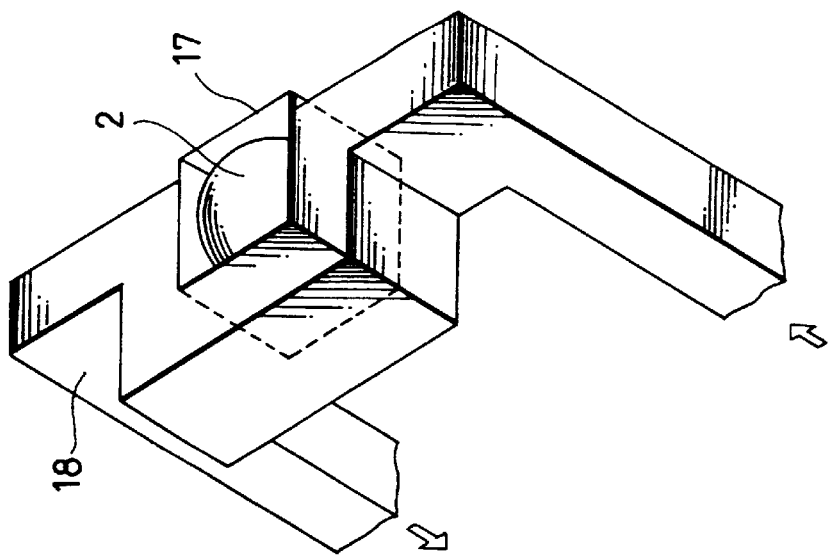
FIG. 9 is a diagram showing an embodiment of a cooling device of a light source.

Initially, as shown in FIG. 9, for example, a duct 18 for passing the cooling air is laid along a light source portion 17 surrounding the light source 2 formed of a halogen lamp or the like.

Then, in this duct 18, the cooling air is circulated by a natural convection or is forced to be circulated by the air flow generator means such as the fan and so on.

In the case of FIG. 9, the light source portion 17 is opened at its side from which the light from the light source 2 is radiated.

Figure 10:
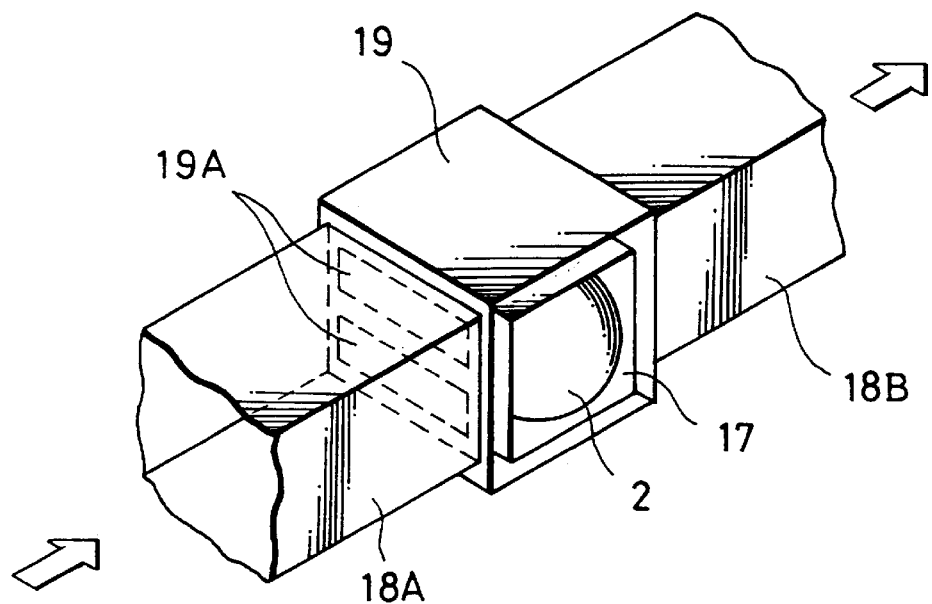
FIG. 10 is a diagram showing another embodiment of a cooling means of a light source.

Also, as shown in FIG. 10, for example, in correspondence with the light source portion 17, an air-charging duct 18A and an air exhaust duct 18B are coupled to a fixing member 19 which fixes the position of the light source portion 17.

Then, in the ducts 18A, 18B, the cooling air is circulated by a natural convection or is forced to be circulated by the air flow generator means such as the fan and the like.

The fixing member 19 is made of a heat-resistant mold resin or the like, for example, and includes an opening 19*a* of approximately rectangular shape defined on its side surface. The air can be circulated into the light source portion 17 through this opening 19A.

Further, if the light source portion 17 has a large number of openings 17A (see FIG. 11), then the air flowed from the opening 19A of the fixing member 19 can be circulated through this opening 17A into the light source 2.

Also in this case, the light source portion 17 is opened at its side from which the light from the light source 2 is radiated.

Figure 11:
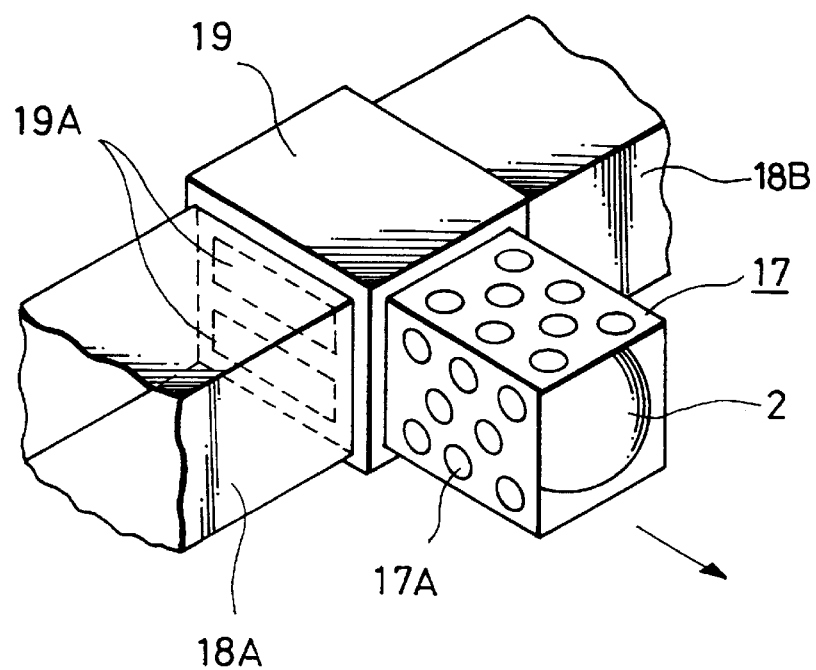
FIG. 11 is a diagram showing the state in which a light source unit is detached from FIG. 10.

In this case, as FIG. 11 shows the state that the light source portion 17 is detached, the light source portion 17 may be made detachable from the fixing member 19. Thus, a user can easily change a lamp of the light source 2.

Incidentally, the fixing member 19 may be arranged such that it has the opening 19A defined on its upper surface in addition to the opening defined in the side surface.

Also, only one duct, e.g. the air-charging duct 18A may be provided and the air may be exhausted from the opening 17A of the light source portion 17 and the opening 19A of the fixing member 19.

If the first cooling device for cooling the light source 2 is arranged as described above, then as compared with the case in which the light source 2 and the optical block 3 are cooled by the same cooling device, there can be provided proper cooling in correspondence with the light source 2 and the optical block 3 whose heat generating amounts are different considerably.

Accordingly, it is possible to improve the respective cooling efficiencies of the light source 2 and the optical block 3.

Further, since a freedom with which the light source 2 and the optical block 3 are designed increases, considering various conditions such as a manufacturing cost, a driving cost such as a power consumption or the like of the display apparatus 60, it is possible to provide the display apparatus 60 having a more preferable arrangement.

Also, since the light source 2 is very slightly smudged by dusts as compared with the optical block 3, the light source portion 17 need not always be closed, and the cooling device thereof may have the simple arrangements shown in FIGS. 9 to 11.

Accordingly, it becomes possible to reduce a manufacturing cost, a power consumption or the like of the display apparatus.

The display apparatus and its cooling method according to the present invention are not limited to the aforementioned embodiments and can be modified variously without departing from the gist of the present invention.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A display apparatus comprising:
    a housing having a screen provided on a front surface thereof and forming a first closed structure and having two opening portions formed in a partition thereof;
    an optical block having a second closed structure with an inlet opening and an outlet opening, said outlet opening being connected to one of said two openings of said housing; and
    coupling means for coupling said housing and said optical block by connecting said inlet opening of said optical block with the other of said two openings of said housing, such that air circulates between said housing and said optical block.

2. The display apparatus according to claim 1, further comprising heat-radiation means mounted on said housing for radiating heat from heated air fed to said housing through said optical block.

3. The display apparatus as claimed in claim 2, wherein said heat-radiation means comprises a plurality of heat-radiation fins projecting outwardly from said housing.

4. The display apparatus as claimed in claim 2, wherein said heat-radiation means is exposed to open air outside of said housing.

5. The display apparatus as claimed in claim 2, wherein said heat-radiation means and said housing are formed of a heat conduction material.

6. The display apparatus as claimed in claim 2, wherein said heat-radiation means is comprised of a pipe-shaped member having open ends communicating with an interior of said housing and having an outer surface exposed to open air outside of said housing.

7. The display apparatus as claimed in claim 1, wherein said housing includes an air flow restricting path for restricting a flow of air circulated inside of said housing.

8. The display apparatus as claimed in claim 1, further comprising a dust collector provided in said coupling means in a circulation path of said air.

9. The display apparatus as claimed in claim 8, wherein said dust collector is removable from said circulation path.

10. A display apparatus comprising:
    a housing having a screen provided on a front surface thereof and having two opening portions formed in a partition thereof;
    an optical block containing a plurality of optical elements and having a closed housing with an inlet opening and an outlet opening, said outlet opening being connected to one of said two opening portions of said housing;
    a light source;
    first cooling device having at least one airflow duct for cooling said light source; and
    second cooling device having an outlet connected to said inlet opening of said optical block and having an inlet connected to the other of said two openings of said housing for cooling said optical block.

11. The display apparatus as claimed in claim 10, wherein said optical block is closed.

12. The display apparatus as claimed in claim 10, wherein said second cooling device comprises a coupling means provided between said optical block and said housing for connecting said inlet opening of said optical block and said one of said two openings of said housing in order to allow for circulation of air.

13. A method of cooling a display apparatus including a first housing having a screen provided on its front surface, an optical block and a light source, the method comprising the steps of:

forming two openings in a partition of said first housing;

forming at least said optical block as a closed structure with a second housing having an inlet opening and an outlet opening;

connecting said outlet opening to one of said two openings in said first housing;

coupling said first housing and said second housing of said optical block by connecting said inlet opening of said optical block with the other of said two openings of said first housing;

cooling said optical block by circulation of air, and cooling said light source by circulation of air independently of said step of cooling said optical block.

14. The method of cooling a display apparatus as claimed in claim 13, wherein said air is circulated in said step of cooling said light source by natural convection.

15. The method of cooling a display apparatus as claimed in claim 13, wherein said air is circulated in said step of cooling said optical block by an air flow generator.

16. The method of cooling a display apparatus as claimed in claim 15, further comprising the step of constructing said air flow generator using a fan.

17. The method of cooling a display apparatus as claimed in claim 13, further comprising the step of constructing said first housing so that heat of said air is radiated through an upper surface of said first housing.

18. A method of cooling a display apparatus including a housing having a screen provided on its front surface, an optical block and a light source, the method comprising the steps of:

cooling said light source by a passive cooling device including at least one airflow duct, and cooling said optical block by a second cooling device including a fan operating independently of said step of cooling said light source.

* * * * *